United States Patent [19]

Matsuda et al.

[11] 4,254,398

[45] Mar. 3, 1981

[54] TIRE PRESSURE DROP ALARMING APPARATUS

[75] Inventors: Akira Matsuda, Higashimurayama; Norio Goshima, Musashino; Shigeo Yasuda, Musashino; Motoaki Iwasaki, Musashino; Hiroshi Nishino, Musashino, all of Japan

[73] Assignees: Bridgestone Tire Company Limited; Mitaka Instrument Company Limited, both of Tokyo, Japan

[21] Appl. No.: 946,373

[22] Filed: Sep. 27, 1978

[30] Foreign Application Priority Data

Sep. 29, 1977 [JP] Japan .............................. 52-130900[U]
Jun. 20, 1978 [JP] Japan .............................. 53-84351[U]

[51] Int. Cl.³ ........................................... B60C 23/04
[52] U.S. Cl. ............................. 340/58; 24/81 BA; 73/146.8; 200/61.22
[58] Field of Search ............. 340/58; 200/61.22, 61.25, 200/61.26; 73/146.3, 146.5, 146.8; 24/73 AS, 73 BP, 81 BA; 301/39 C

[56] References Cited

U.S. PATENT DOCUMENTS

| 2,629,086 | 2/1953 | Ainsworth et al. | 340/58 |
| 2,894,246 | 7/1959 | DeGraffenried | 340/58 X |
| 3,462,734 | 8/1969 | Neu | 340/58 |
| 3,602,884 | 8/1971 | Brumbelow | 340/58 |
| 3,895,347 | 7/1975 | Takusagawa et al. | 340/58 |
| 3,930,224 | 12/1975 | Whiteing et al. | 200/61.25 X |
| 4,114,846 | 9/1978 | Petersen | 24/73 AP X |

*Primary Examiner*—John W. Caldwell, Sr.
*Assistant Examiner*—Joseph E. Nowicki
*Attorney, Agent, or Firm*—Cushman, Darby & Cushman

[57] ABSTRACT

This invention is concerned with a tire pressure drop alarming apparatus for signaling an abnormal pressure drop of a pneumatic tire by transforming the pressure drop into an electric signal.

The apparatus comprises a resonating circuit including a resonance coil and a resonance condenser and includes a retaining body made of metal. The retaining body includes a bottom plate portion interposed between and separating the resonance coil from a vertical portion of a rim flange in such a way that the vertical portion of the rim flange can prevent effects imparting characteristics of the resonance coil, and a side plate portion integrally connected with the base plate portion to be interposed connected with the base plate portion to be interposed between and separating the resonance coil from the parallel portion of the rim flange in such a way that a parallel portion of the rim flange can prevent effects imparting characteristics of the resonance coil, the retaining body being attached to the rim flange with the base plate portion and the side plate portion not deformed.

Figure 4:
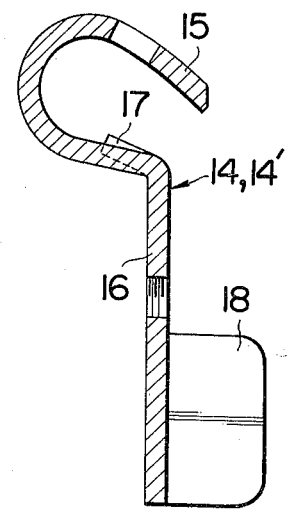

6 Claims, 20 Drawing Figures 4,254,398

TIRE PRESSURE DROP ALARMING APPARATUS

FIELD OF THE INVENTION

This invention relates to a tire pressure drop alarming apparatus for signaling an abnormal pressure drop of a pneumatic tire by transforming the pressure drop into an electric signal.

BACKGROUND OF THE INVENTION

Conventionally, there have been proposed a wide variety of tire pressure drop alarming apparatuses for signaling an abnormal pressure drop for a pneumatic tire. One type of apparatus comprises a resonator attached to the outerside of a rim flange of a wheel rim which includes a vertical portion substantially perpendicular to a rotational axis of the tire and a parallel portion integrally formed with the radially outer end of the vertical portion and in parallel with the rotational axis of the tire. In general, there are many different rim flange forms of the wheel rim depending upon its kind and not produced accurately on the basis of Japanese Industrial Standards so that if the conventional resonator is attached to the rim flange, the characteristic such as resonance frequency and sensitivity Q of the resonator receives effects from the rim flange and is thus fluctuated depending upon its position. In this instance, it is impossible for the resonator to receive magnetic energy from an oscillation coil provided on a body of a car so that the alarming apparatus can not alarm the abnormal pressure drop if it occurs. On the other hand, the resonator attached with a usual balance weight is easily separated from the outside wall of the wheel rim owing to deflection of the tire, vibration of the wheel rim, and centrifugal force acting on the resonator while the car is moving, or otherwise suddenly scattered at an extremely high accelation speed so that it is extremely dangerous for adjacent cars and human bodies.

It is therefore an object of the present invention to provide a tire pressure drop alarming apparatus which can retain a constantly stable characteristic of a resonator to be attached to a wheel rim regardless of the different kinds of the wheel rim and the attachment position to the wheel rim of the resonator.

It is another object of the present invention to provide a tire pressure drop alarming apparatus wherein the resonator is firmly attached to the outside of the rim flange to prevent dangers caused by separation and scattering of the resonator from the rim flange.

The above and other ojects, features and advantages of the present invention will become clear from the following particular description of the invention and the appended claims, taken in conjunction with the accompanying drawings which show by way of example a preferred embodiment of the present invention.

Figure 1:
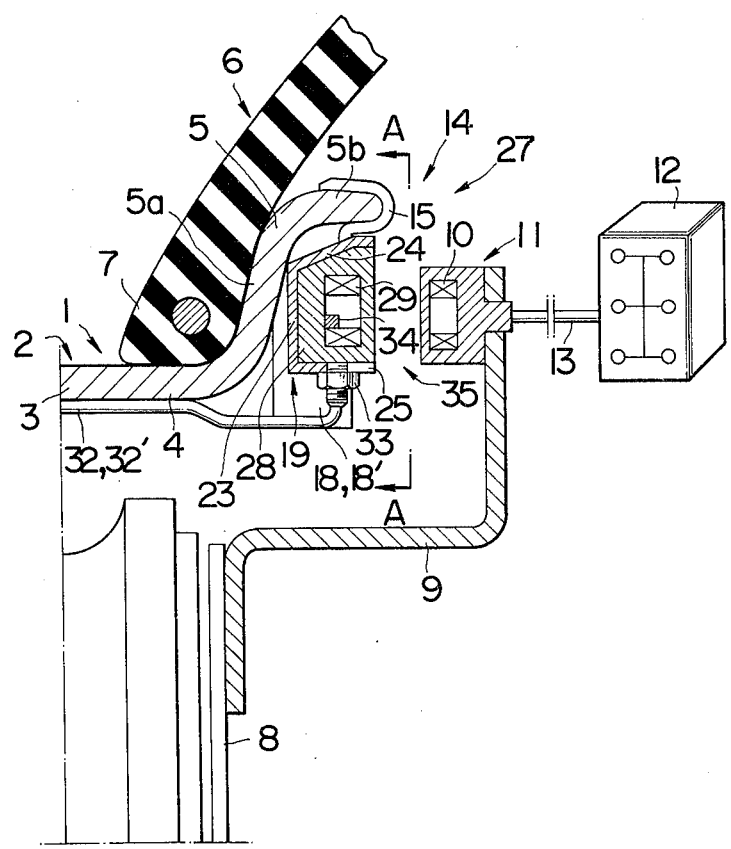
Figure 2:
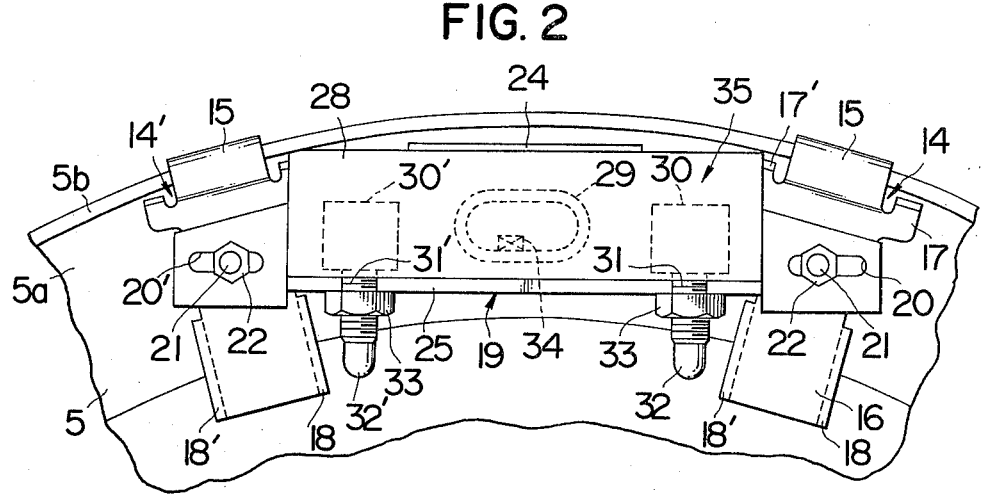
Figure 3:
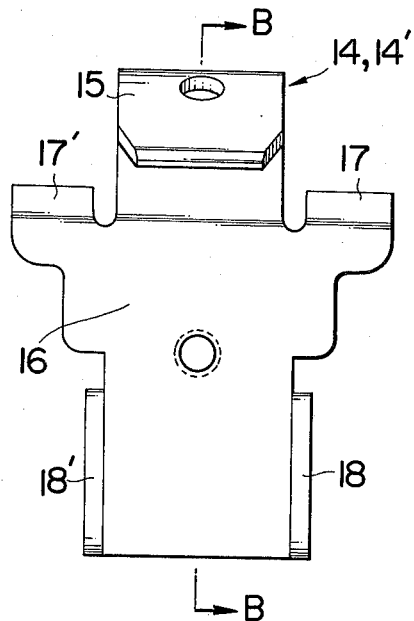
Figure 7:
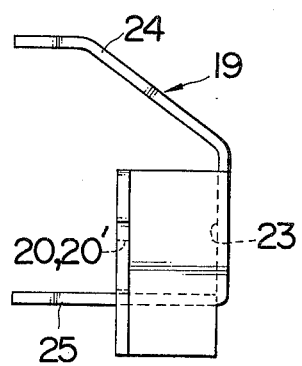
Figure 5:
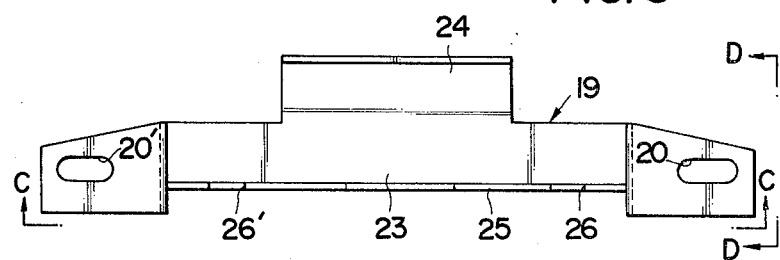
Figure 6:
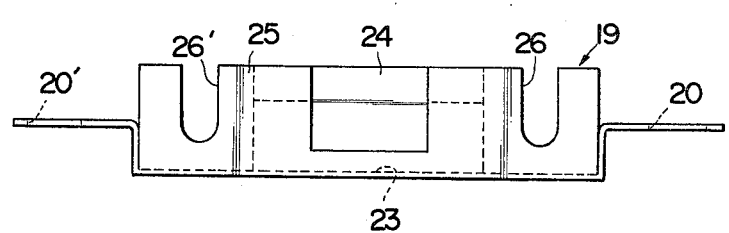
Figure 8:
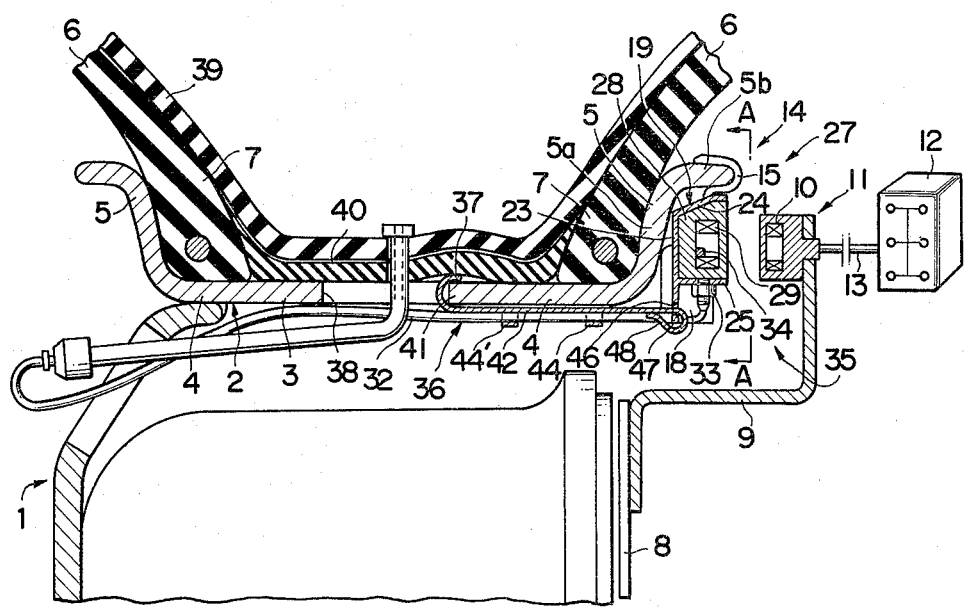
Figure 9A:
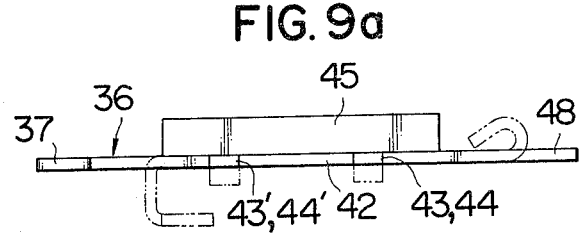
Figure 9B:
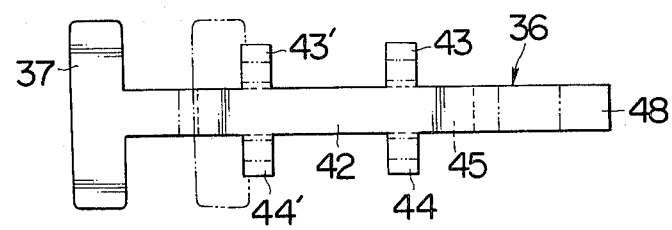
Figure 10:
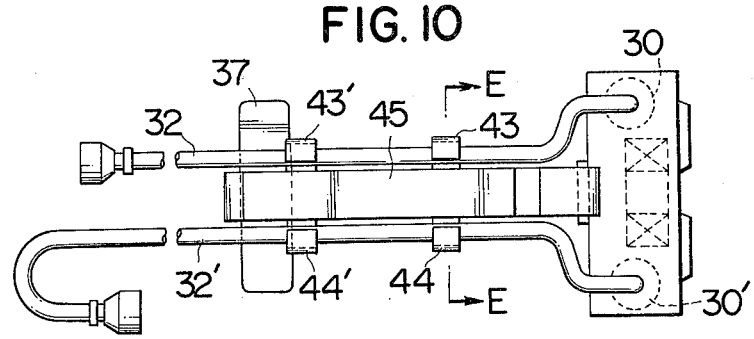
Figure 11:
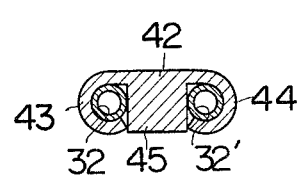
Figure 12:
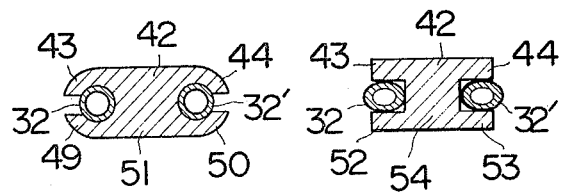
Figure 13:
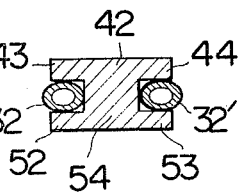
Figure 14A:
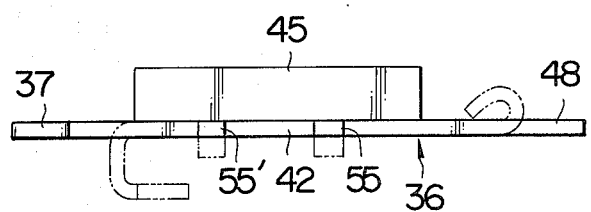
Figure 14B:
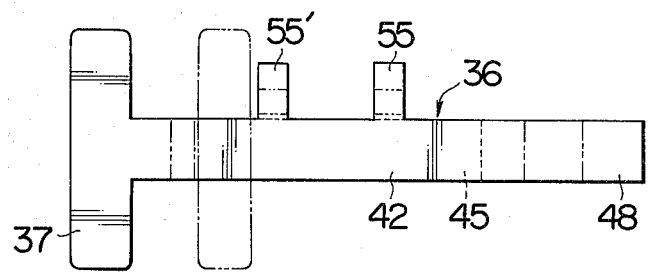
Figure 15:
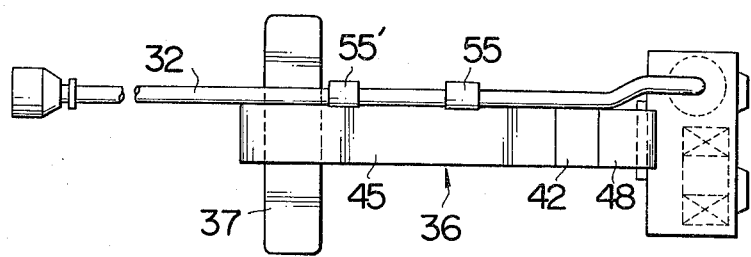
Figure 16A:
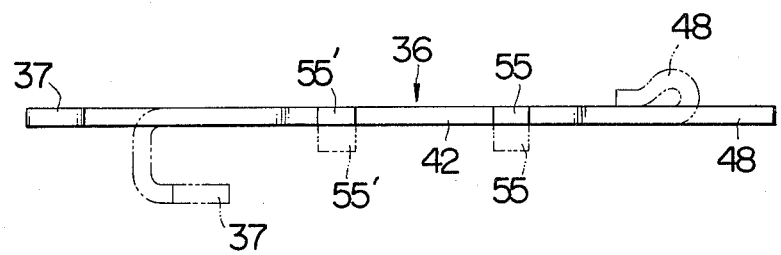
Figure 16B:
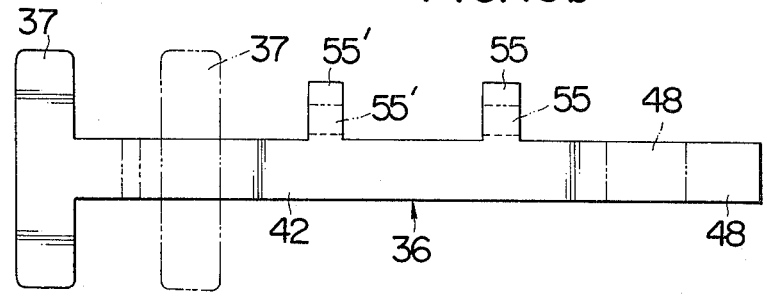
Figure 17:
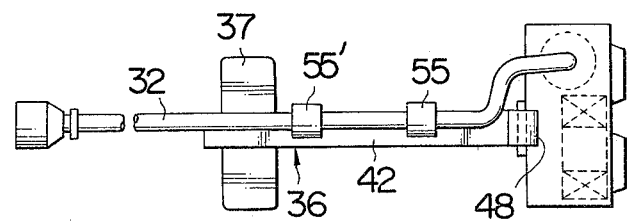

In the accompanying drawings:

FIG. 1 is a partially cross-sectional view of a resonator which is attached to a wheel rim in accordance with the present invention, FIG. 2 is a partial side view as seen from the lines A—A in FIG. 1, FIG. 3 is a plan view of a retainer, FIG. 4 is a cross-sectional view as seen from the lines B—B in FIG. 3, FIG. 5 is a plan view of a retaining plate, FIG. 6 is a view as seen from the lines C—C in FIG. 5, FIG. 7 is a view as seen from the lines D—D in FIG. 5, FIG. 8 is a partially cross-sectional view similar to FIG. 1 but showing a grasping device for firmly grasping and retaining the retaining plate, FIG. 9a is a plan view of the grasping device, FIG. 9b is a bottom view of the grasping device as shown in FIG. 9a, FIG. 10 is a bottom view of the grasping device showing the resonator and pipes which are held by the grasping device and the retaining plate, FIG. 11 is a cross-sectional view as seen from the lines E—E in FIG. 10, FIG. 12 is a cross-sectional view similar to FIG. 11 but showing a second embodiment of the present invention, FIG. 13 is a cross-sectional view similar to FIG. 11 but showing a third embodiment of the present invention, FIG. 14a is a plan view of the grasping device of a fourth embodiment of the present invention, FIG. 14b is a bottom view of the grasping device as shown in FIG. 14a, FIG. 15 is a bottom view of the grasping device similar to FIG. 10 but showing the grasping device as shown in FIGS. 14a and 14b, FIG. 16a is a plan view of the grasping device of a fifth embodiment of the present invention, FIG. 16b is a bottom view of the grasping device as shown in FIG. 16a, and FIG. 17 is a bottom view of the grasping device similar to FIGS. 10 and 15 but showing the grasping device as shown in FIGS. 16a and 16b.

Referring now to the drawings and in particular to FIGS. 1 and 2, the reference numeral 1 generally designates a wheel rim for automobiles which has a rim 2 at its radially outer end. The rim 2 comprises a cylindrical flat base portion 3, a pair of bead seats 4 provided at the axially outer ends of the flat base portion 3, and a pair of rim flanges 5 each connected to the axially outer end of the bead seat 4. Each rim flange 5 has a vertical portion 5a substantially vertical to a rotational axis of a tire 6 and a parallel portion 5b connected at the radially outer end of the vertical portion 5a in substantially parallel relation to the rotational axis of the tire 6. The tire 6 cross-sectioned in a toroidal form is attached to the wheel rim 1 with its bead portions 7 seated on the bead seats 4 of the rim 2. The reference numeral 8 indicates a back plate which is securely mounted on a body frame not shown and has an axially outer end face securely supporting a radially inner end portion of a curved arm 9. On the radially outer end portion of the arm 9 is securely mounted an oscillator, generally indicated at 11, which has an oscillation coil 10 opposing the vertical portion 5a of the rim flange 5 and an oscillating condenser accommodated therein but not shown so that the oscillation coil 10 may oscillate a magnetic energy. The reference numeral 12 represents an indicator which is provided on a car dashboard to be connected with the oscillator 11 through a cable 13 and is adapted to house a signal processing circuit therein. A pair of retainers 14 and 14' are particularly shown in FIGS. 3 and 4, each having a hook 15 at its radially outer end. The retainers 14 and 14' are attached to the parallel portion 5b of the rim flange 5 to be positioned at the radially outwardly of the rim flange 5 and immediately below the parallel portion 5b in such a manner that the hooks 15 of the retainers 14 and 14' are in engagement with the parallel portion 5b of the rim flange 5 to surround and tightly fit the parallel portion 5b of the rim flange 5. Each of the retainers 14 and 14' has at its radially inner end portion a flat base portion 16 connected with the hook 15 and formed to extend along the axially outer face profile of the vertical portion 5a of the rim flange 5. At the radially outer ends of the flat base portion 16 are formed a pair of turnup portions 17 and 17' which are disposed at and integrally formed with both sides of the flat base portion 16 to be brought into engagement with the radially inner face of the parallel portion 5b of the rim flange 5 for preventing the retainers 14 and 14' from being easily removed out of the rim flange 5 when the retainers 14 and 14' are attached to the rim flange 5. Each of the retainers 14 and 14' has at its radially inner end portion a pair of spaced gird portions 18 and 18' extending axially inwardly of the tire 6 from the radially inner end portion of the flat base portion 16 to protect pipes, hereinafter particularly described, from being damaged when the wheel rim 1 is under rotation as well as to protect an assembly of the tire 6 and the wheel rim 1 from being damaged when the assembly is assembled into the wheel body.

With reference to FIGS. 5, 6 and 7, there is shown a retaining plate 19, made of metal, which has longitudinally outer end portions formed with slots 20 and 20'. As particularly illustrated in FIG. 2, a bolt 21 is inserted into each of the slots 20 and 20' and passing through the flat base portion 16 to be in threaded relation with a nut 22, so that the retaining plate 19 is attached to the retainers 14 and 14' to be disposed at the axially outwardly of the vertical portion 5a and immediately below the parallel portion 5b. With the movements of the retainers 14, 14' and the bolts 21 along the slots 20 and 20' of the retaining plate 19, the retaining plate 19 can be adjusted to be in tight contact with the radially inner face of the rim flange 5. The retaining plate 19 has at its longitudinally intermediate portion a flat base plate portion 23 which extends along the axially outer face profile of the vertical portion 5a of the rim flange 5. A side plate portion 24 is integrally connected to the radially outer end of the base plate portion 23 to be inclined at an obtuse angle with respect to the base plate portion 23 and to extend along the radially inner face profile of the parallel portion 5b of the rim flange 5. A standing portion 25 is integrally connected with the radially inner end of the base plate portion 23 to extend vertically with respect to the base plate portion 23. In the standing portion 25 is formed a pair of slots 26 and 26' spaced apart from each other in the longitudinal direction of the retaining plate 19. The foregoing retainers 14, 14' and the retaining plate 19 constitute as a whole a retaining body generally denoted by the reference numeral 27 in the present invention.

Referring again to FIGS. 1 and 2, the reference numeral 28 indicates a case made of a synthetic resin and housed in a space defined by the base plate portion 23, the side plate portion 24 and the standing portion 25 of the retaining plate 19. A resonance coil 29 is embedded in the case 28 to be disposed at a position separated from the vertical portion 5a of the rim flange 5 by the base plate portion 23 of the retaining plate 19 and separated from the parallel portion 5b of the rim flange 5 by the side plate portion 24 of the retaining plate 19. The cross-sectional contour of the resonance coil 29 cross-sectioned in a plane perpendicular to the rotational axis of the tire 6 is formed in an elongated circular shape having a length measured in the radial direction of the tire 6 shorter than that measured in the circumferential direction of the tire 6 as shown in FIG. 2. It is therefore to be understood that the base plate portion 23 of the retaining plate 19 is interposed between the vertical portion 5a of the rim flange 5 and the resonance coil 29, and that the side plate portion 24 of the retaining plate 19 is interposed between the parallel portion 5b of the rim flange 5 and the resonance coil 29. A pair of detection switches 30 and 30' are embedded in the case 28 to permit the resonance coil 29 to be interposed therebetween, and respectively have at their radially inner ends hollow threaded shafts 31 and 31' which are adapted to project out of the case 28 and extend throughout the slots 26 and 26', respectively. Pipes 32 and 32' are connected at their one ends with the hollow threaded shafts 31 and 31', and the pipes 32, 32' and the case 28 are retained by the retaining plate 19 in such a way that nuts 33 and 33', which are respectively threadedly engaged with the hollow threaded shafts 31 and 31', and the case 28 tightly receive the standing portion 25 of the retaining plate 19 therebetween. The one end portions of the pipes 32 and 32' are protected from being damaged by the gird portions 18 and 18' of the retainers 14 and 14', respectively as has been described. The pipes 32 and 32' are connected at their other ends with the inner chambers so that the inner pressures of the two tires 6 can be introduced to the detection switches 30 and 30'. In the case 28 is embedded a resonance condenser 34 which is electrically connected with the resonance coil 29 and the detection switches 30, 30'. The above-mentioned resonance coil 29, the detection switches 30, 30' and the resonance condenser 34 constitute as a whole a resonance circuit generally indicated at 35.

The operation of the apparatus of the present invention thus constructed above will now be described hereinlater.

In order to attach the resonator according to the present invention to the wheel rim 1, the retainers 14 and 14' are firstly required to be attached to the rim flange 5 of the wheel rim 1. At this time, the flat base portions 16 are not deformed although the hooks 15 are somewhat deformed. The retaining plate 19 is then attached to the retainers 14 and 14' by means of the bolts 21 and the nuts 22. At this time, the base plate portion 23 and the side plate portion 24 of the retaining plate 19 are not deformed since the retaining plate 19 is attached to the flat base portions 16 of the retainers 14 and 14'. The case 28 connected with the pipes 32 and 32' is then retained by the retaining body 27. At this time, the resonance coil 29 is spaced at a predetermined distance from the base plate portion 23 and the side plate portion 24 of the retaining plate 19, with the result that the resonance coil 29 receives a predetermined effect from the base plate portion 23 and the side plate portion 24 of the retaining plate 19, thereby causing the characteristic, i.e., resonance frequency and sensitivity Q of the resonance coil 29 to be made stable at a constant value. That is to say, the resonance coil 29 is protected from the effect given to its characteristic from the vertical portion 5a and the parallel portion 5b of the rim flange 5 by means of the base plate portion 23 and the side plate portion 24 of the retaining plate 19, while the resonance coil 29 is given a predetermined effect from the base plate portion 23 and the side plate portion 24 of the retaining plate 19. It will therefore be understood that a stable characteristic of the resonator can be obtained even if the resonator will be attached to any kinds of wheel rim, or even if the resonator will be attached to any positions of the wheel rims having different shapes. When a normal tire pressure is filled in the automobile tire 6 running with such a resonator, the detection switches 30 and 30' are not operated and the magnetic energy from the oscillation coil 10 is imparted to the resonance coil 29 only one time at every time when the resonance coil 29 faces the oscillation coil 10 at every revolution of the tire 6. At this time, the indicator 12 is not operated. When the tire pressure is then abnormally varied, i.e., dropped from the normal pressure level by some reason such as puncture, the pressure drop variation is transmitted to the detection switches 30 and 30' by way of the pipes 32 and 32' to operate the detection switches 30 and 30'. As a consequence, the resonance coil 29 can not receive the magnetic energy from the oscillation coil 10 and the pressure drop of the tire is then transformed into an electrical signal to operate the indicator 12 so that a driver can perceive an alarm from the indicator 12.

According to the present invention, the retainers 14 and 14' may be integrally formed with the retaining plate 19. The retainers 14 and 14' are not necessarily needed in the present invention, wherein a pair of protrusions are required to be formed on the outer surface of the vertical portion of the rim flange and each to have a threaded bore into which a bolt is inserted, thereby causing the retaining plate to be attached to the wheel rim. Where there has been described in the above embodiment about a pair of detection switches which can detect abnormal pressure drops of a pair of tires, only one detection switch may be provided to detect an abnormal pressure drop of only one tire according to the present invention.

Secondly, embodiments of a grasping device of the present invention will now be described hereinafter with reference to the drawings wherein same parts or elements as mentioned above are given same reference numerals to avoid tedious description.

FIGS. 8, 9a, 9b and 10 particularly show a grasping device, generally indicated at 36, which is made of a flexible metal and is formed in substantial T-shape in an expanded state as shown in full lines of FIGS. 9a and 9b. The grasping device 36 comprises a first grip end portion 37 formed at its one end portion and inserted into and turned up at a tube valve bore or slot 38 to partially surround an inner edge 41 of the tube valve bore 38 as shown in full lines of FIG. 8 and phantom lines of FIGS. 9a and 9b. The tube valve bore 38 is formed in the flat base portion 3 of the rim 2 to extend axially of the tire 6, and the first grip end portion 37 is interposed between the rim 2 and a flap 40, the latter of which is disposed between a tire tube 39 and the rim 2. The grasping device 36 further comprises an intermediate flat portion 42 which is integrally connected with the first grip end portion 37 to extend axially of the tire 6 along the inner periphery of the rim 2. At the intermediate flat portion 42 are two pairs of spaced pipe grasping projections 43, 43', 44 and 44', the former two of which are adapted to grasp the pipe 32 and the latter two of which are adapted to grasp the pipe 32' as shown in FIGS. 10 and 11. To the outer face of the intermediate flat portion 42 opposite to the rim 2 is attached a square bar 45 to extend along the intermediate flat portion 42. The height of the square bar 45, i.e., the length of the square bar 45 measured in the radial direction of the tire 6 is at least substantially identical to or somewhat larger than the diameter of the pipes 32 and 32' which are adapted to extend along the side walls of the square bar 45. It is therefore possible to protect the pipes 32 and 32' from being damaged by parts of the vehicle body upon assembling of the tire to the vehicle and by stones upon running of the car.

As shown in FIG. 8, a leg 47 having a slit 46 is formed to extend downwardly at the lower end, i.e., radially inner end of the base plate portion 23 of the retaining plate 19. The grasping device 36 further comprises a second grip end portion 48 formed at the other end portion thereof to be inserted into the slit 46 of the leg 47 and to be turned up as shown in FIGS. 8, 9a and 9b. It is therefore to be understood that such attachment of the second grip end portion to the slit 46 of the leg 47 causes the case 28 and the retaining plate 19 to be fixedly supported by the rim flange 5 axially outwardly of the vertical portion 5a of the rim flange 5 and below the parallel portion 5b of the rim flange 5.

There are shown in FIG. 12 pipe grasping members 49 and 50 which may be provided on a square bar 51 to surround and grasp the pipes 32 and 32' in cooperation with the pipe grasping projections 43 and 44 according to the present invention. FIG. 13 shows pipe grasping members 52 and 53 which may be provided on a square bar 54 to support the pipes 32 and 32' in cooperation with the pipe grasping projections 43 and 44 according to the present invention.

Where there has been disclosed a grasping device 36 for use in a tire pressure drop alarming apparatus of double tires, the grasping device 36 may be used for a tire pressure drop alarming apparatus for a single tire in such a way that a pipe grasping member 55 is formed at one side of the intermediate flat portion 42 as shown in FIGS. 14a, 14b and 15 according to the present invention.

The square bar 45 may be omitted from the intermediate flat portion 42 as shown in FIGS. 16a, 16b and 16 if not necessary according to the present invention.

What is claimed is:

1. A tire pressure drop alarming apparatus for alarming an abnormal pressure drop of a tire by transforming said pressure drop into an electric signal, comprising a detection switch for detecting pressure drop of pressurized air in a tire; an air pipe connecting said detecting switch and a valve stem of said tire for allowing said pressurized air into said detection switch; a resonance coil resonating to electric waves radiated from an oscillation coil positioned opposite thereto when said detection switch detects a predetermined pressure drop of said pressurized air; said tire pressure drop alarming apparatus being positioned axially outwardly from a rim flange of a wheel rim which has a vertical portion substantially vertical to a rotational axis of said tire and a parallel portion connected at the radially outward end of said vertical portion in substantially parallel relation to the rotational axis of said tire and is adapted to retain said detection switch, said air pipe, and said resonance coil, the apparatus further including a resonance condenser and a retaining body made of metal including a base plate portion interposed between and separating said resonance coil from said vertical portion of said rim flange in such a way that said vertical portion of said rim flange is prevented from imparting characteristics to said resonance coil, and a side plate portion integrally connected with said base plate portion interposed between and separating said resonance coil from said parallel portion of said rim flange in such a way that said parallel portion of said rim flange is prevented from imparting characteristics to said resonance coil, said retaining body being attached to said rim flange with said base plate portion and said side plate portion remaining undeformed.

2. A tire pressure drop alarming apparatus as set forth in claim 1, which further comprises a grasping device including a first grip end portion formed in a longitudinal one end inserted within and secured to a tire valve bore so as to partially surround an inner edge of said valve bore, an intermediate flat base portion integrally connected with said first grip end portion to extend axially of said tire along the inner peripheral of said rim, and a second grip end portion formed in a longitudinal other end portion to be in engagement with said retaining body for preventing said retaining body from being dropped from said rim flange, and an air pipe grasping projection provided on said intermediate flat base portion to grasp said air pipe along said intermediate flat base portion.

3. A tire pressure drop alarming apparatus as set forth in claim 2, wherein a square bar is attached to said intermediate flat base portion opposite said rim so as to extend along said intermediate flat portion said square bar having a height measured in the radial direction of said tire at least substantially identical to the diameter of said air pipe.

4. A tire pressure drop alarming apparatus as set forth in claim 1, wherein said retaining body includes a pair of retainers each having a hook member in engagement with said parallel portion of said rim flange to surround and tightly fit on said parallel portion of said rim flange, said hook member having a radially extending inner end, said retaining body further including a flat base portion connected with the radially extending inner end of said hook member and formed so as to extend along the axially outer profile of said vertical portion of said rim flange, said flat base portion having a radially extending inner end portion, said retaining body further including a pair of spaced gird portions extending axially inwardly of said tire from the radially extending inner end portion of said flat base portion; and a retaining plate having a flat base plate portion extending along an outer face profile of said vertical portion of said rim flange, a side plate portion having a radially extending inner end, said side plate portion being integrally connected to the radially extending outer end of said flat base plate portion and inclined at an obtuse angle with respect to said flat base plate portion so as to extend along a radially inner face profile on said parallel portion of said rim flange, and a standing portion integrally connected with the radially extending inner end of said base plate portion so as to extend vertically with respect to said flat base plate portion, wherein said retaining plate is firmly connected to said pair of retainers.

5. A tire pressure drop alarming apparatus as set forth in claim 4, wherein each of said retainers further has a pair of turnup portions disposed at and integrally formed with both sides of said flat base portion to be brought into engagement wih the radially inner face of said parallel portion of said rim flange for preventing said retainers from being easily removed out of said rim flange when said retainers are attached to said rim flange.

6. A tire pressure drop alarm apparatus as in claim 1, wherein said retaining body includes a pair of retainer members each having a hook portion for securely engaging said parallel portion, a flat base portion secured to each of said retainer members so as to extend along the axially outer profile of said vertical portion, said flat base portion having a radially extending inner end portion, a pair of spaced gird portions extending axially inwardly of said tire from the radially extending inner end portion of said flat base portion, a retaining plate having a flat base plate portion with a radially extending outer end, said flat base plate portion extending along the outer face profile of said vertical portion, a side plate portion having a radially extending inner end, said side plate portion being integrally connected to the radially extending outer end of said flat base plate portion and inclined at an obtuse angle with respect to said flat base plate portion so as to extend along the profile of said parallel portion, and a standing portion integrally connected with the radially extending inner end of said base plate portion so as to extend vertically with respect to said flat base plate portion.

* * * * *